Sept. 6, 1955 P. R. FRANCIS 2,716,824
SLUSHING SCRAPER
Filed Sept. 8, 1950 3 Sheets-Sheet 3
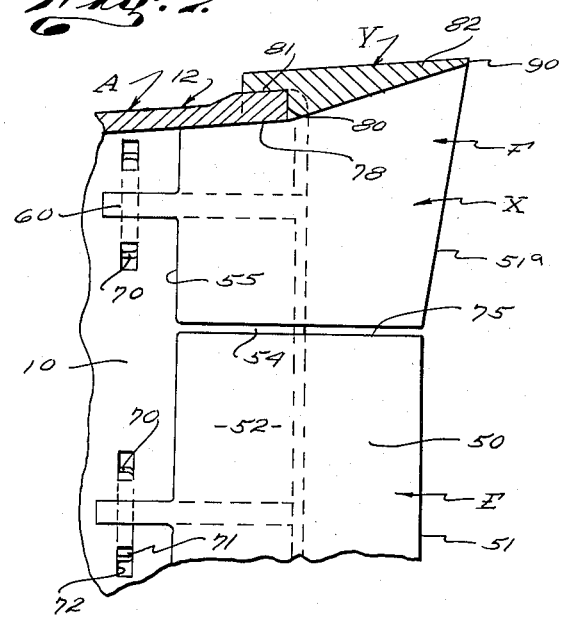
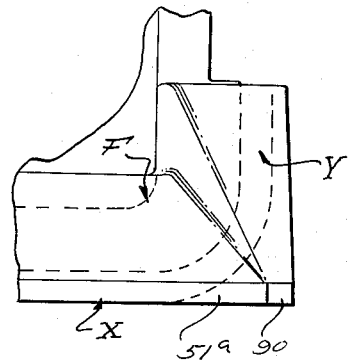
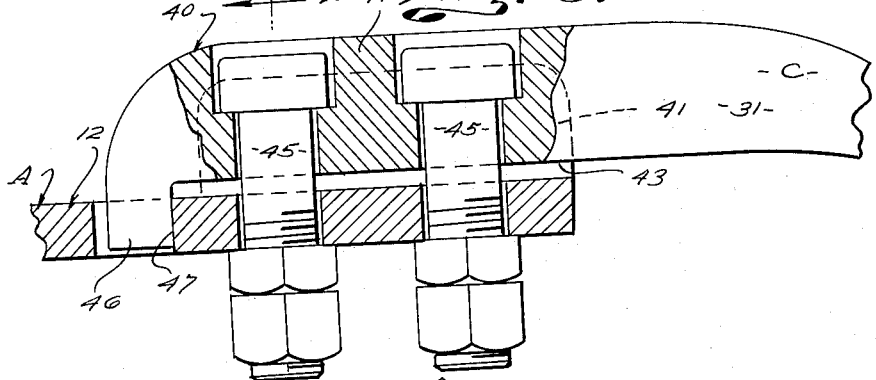
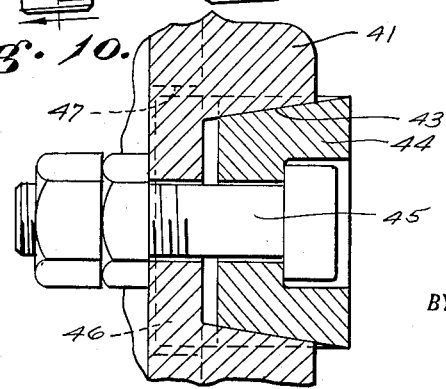
INVENTOR.
Paul R. Francis
BY
Attorney United States Patent Office 2,716,824
Patented Sept. 6, 1955

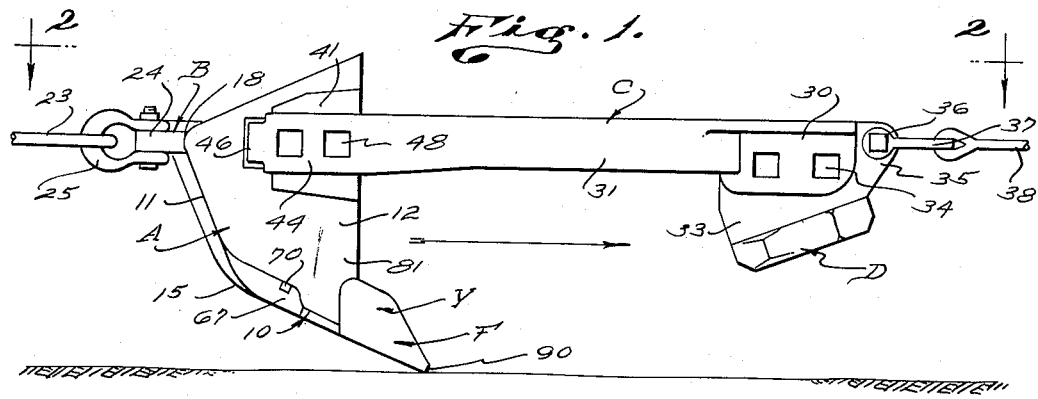
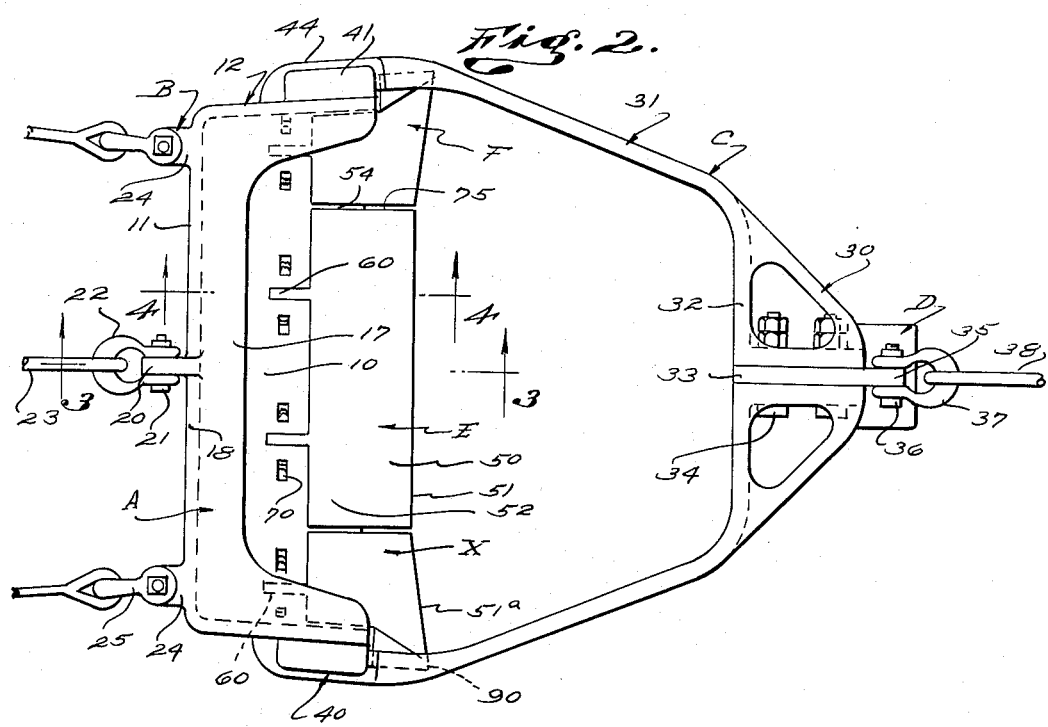

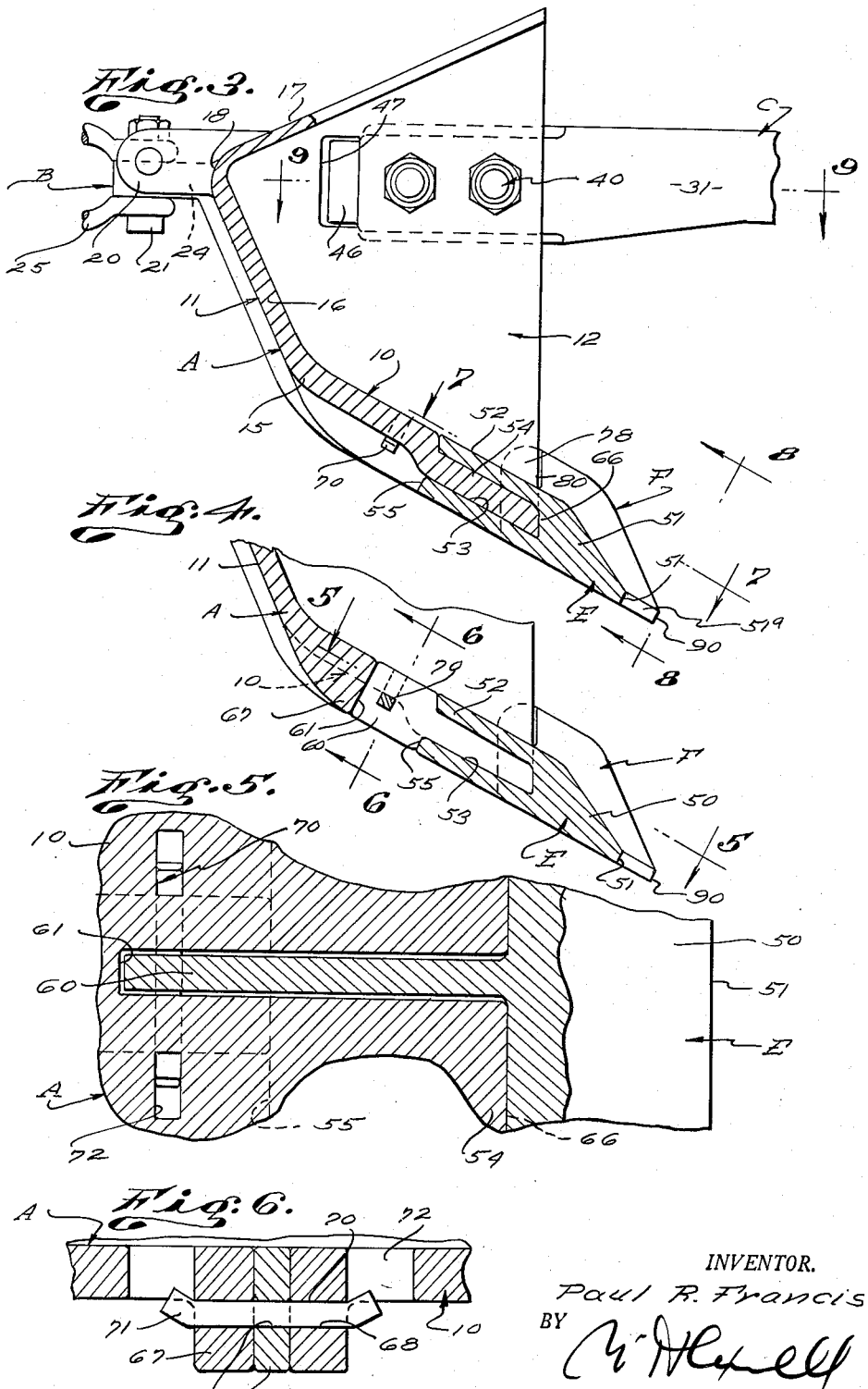

2,716,824

SLUSHING SCRAPER

Paul R. Francis, Los Angeles, Calif., assignor to Alloy Steel and Metals Company, Los Angeles, Calif., a corporation of California Application September 8, 1950, Serial No. 183,792

8 Claims. (Cl. 37—147)

This invention has to do with a slushing scraper such as is usually operated by a line and which may be used to handle a wide range of materials under various working conditions. It is a general object of the present invention to provide a slushing scraper having simple, effective, replaceable wear taking parts that are dependable and durable, and which are so mounted as to be easily and quickly removed for repair or replacement.

Slushing scrapers or material handling buckets are commonly operated by drag lines and are used generally where material is to be handled, as, for instance, in mines, excavations, on grading and construction work, etc. The usual slushing scraper is dragged or operated through bodies of material or in trough-like grooves or channels with the result that there is a marked tendency for the corners, that is, the lower forward portions of the scraper, to wear excessively.

It is a general object of this invention to provide a scraper or a bucket-like structure with replaceable or renewable blades at the wear taking parts or points, which blades effectively protect the basic structure or body of the scraper at the lower forward portions, where maximum wear usually occurs.

Another object of this invention is to provide a scraper construction of the general character referred to having a simple, effective, dependable blade construction with mounting means that securely retain the blades and which can be operated easily and quickly when it is desired to replace or renew the blades.

Another object of the invention is to provide blades separate from the body so that the blades can be made of a tough, wear resistant material, while the body, not being subjected to as much wear as the blades, can be made of a softer, less wear resistant, and cheaper material.

The structure in which the invention is incorporated involves, generally, a body with a bottom, back and sides. A rear line connection is provided at the back or rear of the body and a forward line conection is provided at the front of the body. The forward line connection is in the nature of a yoke with a head at its forward end and with arms that diverge from the head and have their outer ends connected to the sides of the body. The yoke is sectional, being divided through the head, and an insert in the form of a plate is connected between the head sections, the head sections and plate being secured together by bolts. The plate has a forwardly projecting apertured part that carries a pin that holds a shackle. The rear or outer ends of the yoke arms are joined to the sides of the body where bosses occur. The bosses have channels with inwardly converging walls and extensions of the arms are wedge-shaped and fit into the channels. Bolts connect the sides and the extensions of the arms and where these parts are connected inwardly projecting anchor lugs on the extensions of the arms engage in openings in the sides of the body and relieve the bolts of shearing strain.

The invention provides blades at the forward working or wear-taking parts of the body. In the preferred form I provide one or more center blades at the leading edge portion of the bottom and corner blades continuing from the ends of the center blade or blades as the case may be. The corner blades extend up at the forward portions of the sides of the body where these parts join the bottom. The blades have forwardly converging digging parts and rear shank portions that are channeled and receive the forwardly projecting portions of the body. Each blade is held by a tongue projecting rearwardly therefrom into a recess in the body where it is held by a key, the ends of which are accessible through openings in the body. A feature of the construction is the formation of each corner blade and the manner in which it is related to the body parts so that the body is effectively protected and so that the blade affords a forwardly projecting tip or wear taking part about which the bucket may be rocked. The configuration or extent of the tip may be varied to meet various working conditions.

The various objects and features of my invention will be fully understood from the following detailed description of a typical preferred form and application of the invention, throughout which description reference is made to the accompanying drawings, in which:

Fig. 1 is a side elevation of a bucket embodying the invention, showing it in the position in which it occurs as it is being operated to carry a load. Fig. 2 is a plan view taken as indicated by line 2—2 on Fig. 1. Fig. 3 is an enlarged detailed sectional view taken as indicated by line 3—3 on Fig. 2. Fig. 4 is an enlarged detailed sectional view taken as indicated by line 4—4 on Fig. 2. Fig. 5 is a plan section taken as indicated by line 5—5 on Fig. 4. Fig. 6 is an enlarged transverse sectional view taken as indicated by line 6—6 on Fig. 4. Fig. 7 is a plan view taken as indicated by line 7—7 on Fig. 3. Fig. 8 is a view taken as indicated by line 8—8 on Fig. 3. Fig. 9 is an enlarged longitudinal sectional view taken as indicated by line 9—9 on Fig. 3 and Fig. 10 is a sectional view taken as indicated by line 10—10 on Fig. 9.

The construction provided by the present invention involves, generally, a body A, a line connection B at the rear of the body, a line connection C at the front of the body, a shoe D carried by the line connection C, and blades at the wear taking parts of the body including one or more central blades E and corner blades F.

The body A, which determines the general size, shape and capacity of the bucket, is preferably a unitary element, for instance, a casting, and in the case illustrated it involves, generally, a bottom 10, a back 11 that adjoins the rear edge portion of the body and projects upwardly and rearwardly therefrom, and sides 12. The bottom 10 may be a substantially flat plate-like element or part that is angularly disposed, as shown in Figs. 1, 3 and 4, if the bucket is operating with a load. The back of the body is integrally joined to the rear edge of the bottom at a corner 15, and it has a main portion 16 which is shown as flat and projecting upwardly and rearwardly from the corner 15. At the upper edge of the portion 16 the back has an upwardly and forwardly projecting guard 17 that serves to retain material in the bucket and to cause lifting of the bucket when it becomes filled, the part 17 being joined to the part 16 at a corner 18 which is the rearmost part of the bucket. The sides 12 of the body may be flat vertically disposed plate-like parts joined to and extending upward from the ends of the bottom 10 and projecting forward from the back 11.

The line connection B at the rear of the body A is provided for making connection between a return line or lines and the bucket and in the case illustrated it involves a lug 20 on the rear of the body A, preferably at the corner 18. The lug 20 is preferably integral with the body A and is located about midway between the sides 12 and it is provided with an opening to receive a pin 21 that may serve to hold a shackle 22 engaged by the line 23. Additional lugs 24 are provided at the rear of the body, for instance, at the rear of the corner 18 immediately inward of the sides 12. The lugs 24 may be employed to hold shackles 25 carrying line parts 26 in a case where dual return lines are employed.

The line connection C is at the front or forward portion of body A and in its preferred form involves, essentially, a yoke having a head 30 and arms 31 that project rearwardly from the head and connect to the sides 12 of the body. In the preferred construction the yoke is divided into two like sections, the division being made through the head so that each section has a head portion 32 carrying an arm 31. The head sections 32 have a plate 33 engaged between them and they are held assembled with the plate by means of bolts 34. The plate has a forwardly projecting portion 35 with an opening that receives and carries a pin 36 that holds a shackle 37 to which the draft line 38 is connected.

A suitable means 40 is provided to connect each arm 31 of the yoke to a side 12 of the body A. In the case illustrated each means involves a boss 41 on the exterior of a side 12 of the body. The boss has a channel formed in it with inwardly converging sides 43 and the arm to be connected has an extension 44 which is wedge shaped to engage in the channel as shown in Fig. 10 of the drawings. Bolts 45 connect the wedge shaped extension of the arm and the side where the boss occurs so that the extension is held or wedged tightly in the channel. An anchor lug 46 is formed on and projects inwardly from the arm extension to be engaged in an opening 47 in the side 12 when the extension is seated in the channel 43.

Through the general construction above described when the sections of the yoke are assembled and secured together, as by means of the bolts 34, the extensions 44 of the arm are held in the channels on the sides of the body. The bolts 45 further secure the arm extensions to the bosses on the sides of the body and the lugs 46 engaged in the openings 47 effectively transmit strain directly from the arms to the body so that the bolts 45 operate solely to hold the arm extensions in the channels 43 and are not subject to shear.

In the particular form of the invention illustrated the body A constructed as above described is equipped with three blades, namely, a single central blade E and two corner blades F. It is to be understood that I may employ a plurality of ecnter blades as circumstances require.

The central blade E is mounted on or occupies the forward edge portion of the bottom 10 of body A and extends across a substantial portion of the bottom, leaving the end portions of the bottom to be occupied by the corner blades F. The center blade E may be a substantially flat plate-like unit with a forwardly projecting digging portion 50 with top and bottom surfaces that converge to an entering edge 51. The particular shape of this portion of the blade and the degree to which the edge is sharpened will, in practice, depend upon the service to be performed.

The rear or shank portion 52 of blade E has a channel 53 entering it from the rear edge 55 of the blade. Channel 53 receives the forward edge portion 54 of the bottom 10 of the body A, as clearly illustrated in Fig. 3 of the drawings. In the preferred construction the forward edge portion 54 of bottom 10 is offset somewhat from the balance of the bottom so that it is somewhat below the balance of the bottom, to the end that the blade E is carried by the portion 54 so that its top is substantially flush with the top face of the bottom 10.

A retaining means is provided for securing the blade E in operating position on the bottom 10. Retaining means may involve one or more connections between the blade and the body. In the case illustrated there are two connections which are alike and each involves a tongue 60 formed on and projecting rearwardly from the blade E so that it projects into and occupies a recess 61 that enters the bottom 10 from its forward edge 66 and continues rearwardly in the bottom to a point a suitable distance to the rear of the blade. In the preferred construction the bottom 10 is thickened at either side of the recess 61 by downwardly projecting or depending ribs 67 between which the tongue is entered. When the tongue is fully engaged in the recess and is between the ribs 67 openings 68 and 69 in the ribs and tongue, respectively, register and receive a lock pin 70. In the preferred construction the lock pin is retained in position by having its end or end portions 71 deflected, as shown in Fig. 6. In the preferred form of the invention the ends 71 of the lock pin are deflected upwardly into openings 72 that are provided through the bottom 10, as clearly shown in Figs. 2 and 6. The openings 72 make it simple to deflect the ends 71 of the pin by merely driving them upwardly, and when it is desired to remove the pin the openings 72 serve as access openings, so that a suitable tool or implement can be inserted from the top of the bottom 10 to drive or deflect the ends 71 downwardly and into line so the pin can be easily removed.

The corner blades F are preferably alike and each involves a bottom portion X and a side portion Y. The bottom portion of the corner blade continues from an end 75 of the center blade E to occupy the forward edge portion 54 of the bottom 10 beyond said end 75. The side portion Y of the blade engages and protects the lower forward portion 78 of the side 12 of the body which adjoins the said projecting or end portion of the bottom. The bottom portion X of the corner blade preferably corresponds in formation or in cross sectional configuration with the center blade E, that is, it is provided with a channel 53 that receives the portion 54 of the bottom 10, as shown throughout the drawings. In the preferred form of the invention a retaining means secures the bottom portion X of the corner blade on the body and involves a tongue 60 received in a body recess 61 and which is retained by a pin 70, all in the manner hereinabove described with reference to the retaining means provided for the blade E.

The side portion Y of the corner blade is integral with and continues from the bottom portion X and projects upwardly therefrom to cover the front edge 80 of the side portion 78, as well as the outer surface 81 thereof. In the preferred form of the invention the side 82 of the corner blade that overlaps the outer wall 81 of side part 78 projects a substantial distance forward from the the side 12 and converges outwardly somewhat as it projects forward at the foremost corner or tip 90 of the said corner blade. In the preferred construction the tip 90, which takes wear and about which the structure may pivot, is forward of the edge 51 of the center blade in which case it is desirable to form the forward edge 51$^a$ of the corner blade occurring on the bottom section X thereof so that it extends forward and outward from the point where the corner blade joins the center blade to the tip 90, as shown in Figs. 2 and 7 of the drawings. In practice the shape and extent of the tip 90 may vary widely to meet various working conditions.

The tips or corners 90 formed by the corner blades form effective bearings or points about which the body or bucket, generally, can be rocked, and since they are forward of as well as being laterally outward of the other parts of the structure they effectively protect the other parts of the structure and take a substantial amount of wear. When the tips or corners 90 wear away or back until they are no longer properly effective as protective elements, the corner blades can be renewed or replaced.

From the foregoing description it will be apparent how I have provided three blades that completely and effectively protect the forward or leading portions of the bucket bodies which are subject to wear. These several blades are of simple, inexpensive construction, and they are so engaged with the body A that forces communicated by them incidental to use of the structure are communicated directly to the body without subjecting the retaining means to excessive wear or strain. The retaining means that I have provided is simple and inexpensive of construction, is dependable, and is such that it can be easily and quickly applied and released, as circumstances require.

It will be understood from the foregoing description that the entire scraper or bucket provided by the invention is of such form and design that its various parts can, in practice, be formed by casting. As a result of the cast construction the scraper is inexpensive, sturdy, and particularly practical for the class of service that devices of this kind are subjected to.

Having described only a typical preferred form and application of my invention, I do not wish to be limited or restricted to the specific details herein set forth, but wish to reserve to myself any variations or modifications that may appear to those skilled in the art and fall within the scope of the following claims.

Having decribed my invention, I claim:

1. In a structure of the character described, a bucket-like body having, a bottom and sides projecting up from the ends of the bottom, blades on the body including corner blades each with a bottom section shielding a part of the bottom and a side section shielding a part of one side, and a retaining means on each blade including a tongue on the blade engaged in a recess in the bottom, and a lock pin holding the tongue in the recess, the pin having a deflected end and the bottom having an opening through which said end of the pin is accessible.

2. In a structure of the character described, a unitary free universally movable bucket-like body having, a bottom with a substantially straight transverse forwardly facing edge at the forward end of the bucket and sides projecting up from the ends of said forward edge of the bottom, a rigid draft yoke rigidly connected to the body and projecting forward therefrom and having a part at its foremost end adapted to receive a draft line, and blades on the body including corner blades independently secured to the bottom and each with a bottom section shielding a part of the forward edge of the bottom, a side section shielding a part of one side, the bottom sections of the corner blades projecting forwardly and forming fulcrum points forward of the forward edge of the bottom.

3. In a structure of the character described, a unitary free universally movable bucket-like body having, a bottom with spaced ribs on the lower side thereof and a substantially straight transverse forwardly facing edge interrupted by spaced recesses along the forward portion thereof and sides projecting up from the ends of said forward edge of the bottom, a rigid draft yoke rigidly connected to the body and projecting forward therefrom and having a part at its foremost end adapted to receive a draft line, blades on the body including corner blades and an intermediate blade between the corner blades, each blade being independently secured to the bottom and each corner blade having a bottom section shielding a part of the forward edge of the bottom and a side section shielding a part of one side and having a portion projecting forward of the intermediate blade forming a fulcrum about which the body may turn, and means retaining each blade on the bottom including a tongue rigid with and projecting rearwardly from the blade and into a recess in the forward portion of the edge and a retaining pin engaging the tongue and bottom and extending transversely of the body between the top of the bottom and the bottom of the ribs, the bottom of each blade being flush with the bottoms of the ribs.

4. In a structure of the character described, a unitary free universally movable bucket-like body having, a bottom with a substantially straight transverse forwardly facing edge interrupted by spaced recesses along the forward portion of the bucket and sides projecting up from the ends of said forward edge of the bottom, a rigid draft yoke rigidly connected to the body and projecting forward therefrom and having a part at its foremost end adapted to receive a draft line, blades on the body including corner blades and an intermediate blade independently secured to the bottom, each corner blade having a bottom section shielding a part of the forward edge of the bottom and a side section shielding a part of one side and having a portion projecting forward of the intermediate blade forming a fulcrum about which the body may turn, and a retaining means on each blade including a tongue on the blade rigid therewith and projecting rearward therefrom and a lock pin securing the tongue to the bottom.

5. In a structure of the character described, a unitary free universally movable bucket-like body having, a bottom with a substantially straight transverse forwardly facing edge interrupted by spaced recesses along the forward portion of the bucket and sides projecting up from the ends of said forward edge of the bottom, a rigid draft yoke rigidly connected to the body and projecting forward therefrom and having a part at its foremost end adapted to receive a draft line, blades on the body independently secured to the bottom including corner blades and an intermediate blade between the corner blade, each corner blade having a bottom section shielding a part of the forward edge of the bottom and a side section shielding a part of one side and having a portion projecting forward of the intermediate blade forming a fulcrum about which the body may turn, and a retaining means on each blade including a tongue on the blade rigid therewith and projecting rearwardly therefrom and into a recess in the forward portion of said edge, and a lock pin transverse of the tongue and engaging the bottom and tongue and releasably retaining the tongue in the recess.

6. In a structure of the character described, a unitary free universally movable bucket-like body having a bottom with a substantially straight transverse forwardly facing edge interrupted by spaced recesses along the forward portion of the bucket and sides projecting up from the ends of said forward edge of the bottom, a rigid draft yoke rigidly connected to the body and projecting forward therefrom and having a part at its foremost end adapted to receive a draft line, blades on the body independently secured to the bottom and including corner blades and an intermediate blade between the corner blades, each corner blade having a bottom section shielding a part of the forward edge of the bottom and a side section shielding a part of one side and having a portion projecting forward of the intermediate blade forming a fulcrum about which the body may turn, and a retaining means on each blade including a tongue on the blade rigid therewith and projecting rearwardly therefrom and into a recess in the forward portion of said edge, and a lock pin engaging the bottom and tongue and releasably retaining the tongue in the recess, the pin extending substantially transverse of the body in a direction substantially parallel with the plane of the bottom and confined between the uppermost and lowermost faces of the bottom.

7. An elongate corner blade for a bucket having a body with a forward edge extending transversely of the bucket and a side at one end of said edge and projecting up from the lower portion of the body, the blade including, a bottom portion of substantial extent lengthwise of said edge and having a rearwardly opening channel with upper and lower walls and adapted to receive said edge of the body, an elongate projection on said bottom portion rigid therewith and located intermediate the ends thereof and extending between the walls of the channel and projecting rearwardly therefrom and being adapted to anchor the blade to the body, and an upwardly projecting part at one end of said bottom portion adapted to cover the forward edge of the side.

8. In a structure of the character described, a unitary free universally movable bucket-like body having, a bottom with spaced ribs on the lower side thereof and a substantially straight transverse forwardly facing edge interrupted by spaced recesses along the forward portion of the bucket and sides projecting up from the ends of said forward edge of the bottom, a rigid draft yoke rigidly connected to the body and projecting forward therefrom and having a part at its foremost end adapted to receive a draft line, blades on the body including corner blades and an intermediate blade between the corner blades, each blade being independently secured to the bottom and each corner blade having a bottom section shielding a part of the forward edge of the bottom and a side section shielding a part of one side and having a portion projecting forward of the intermediate blade formiing a fulcrum about whch the body may turn, and means retaining each blade on the bottom including an elongate tongue rigid with and projecting rearwardly from the blade and into a recess in the forward portion of the bucket and a retaining pin engaging the tongue and bottom and extending transversely of the body between the top of the bottom and the bottom of the ribs, the bottom of each blade being flush with the bottoms of the ribs, there being a rearwardly opening channel in each blade in which the said edge of the bottom of the body is received.

References Cited in the file of this patent

UNITED STATES PATENTS

| | | |
|---|---|---|
| 711,992 | Mason | Oct. 28, 1902 |
| 848,743 | Helm | Apr. 2, 1907 |
| 872,439 | Livengood | Dec. 3, 1907 |
| 1,453,540 | Beach et al. | May 1, 1923 |
| 1,546,791 | Page | July 21, 1925 |
| 1,655,013 | Gunnison | Jan. 3, 1928 |
| 1,829,851 | Clark | Nov. 3, 1931 |
| 1,869,320 | Younie | July 26, 1932 |
| 1,999,681 | Bakker | Apr. 30, 1935 |
| 2,092,311 | Hosmer et al. | Sept. 7, 1937 |
| 2,390,611 | Nixon | Dec. 11, 1945 |

FOREIGN PATENTS

| | | |
|---|---|---|
| 969,144 | France | May 17, 1950 |

(Corresponding U. S. 2,626,471, Jan. 27, 1953.)